(12) United States Patent  (10) Patent No.: US 8,719,238 B2
Horn et al. (45) Date of Patent: May 6, 2014

(54) OFFICE-BASED NOTIFICATION MESSAGING SYSTEM

(75) Inventors: Monroe Horn, Franklin, MA (US); Rory A. Apperson, Danielson, CT (US); Andrei S. MacKenzie, Quincy, MA (US)

(73) Assignee: Sunstein Kann Murphy & Timbers LLP, Boston, MA (US)

( * ) Notice: Subject to any disclaimer, the term of this patent is extended or adjusted under 35 U.S.C. 154(b) by 657 days.

(21) Appl. No.: 12/691,708

(22) Filed: Jan. 21, 2010

(65) Prior Publication Data

US 2010/0185665 A1 Jul. 22, 2010

Related U.S. Application Data

(60) Provisional application No. 61/146,517, filed on Jan. 22, 2009.

(51) Int. Cl.
G06F 7/00 (2006.01)
G06F 17/30 (2006.01)

(52) U.S. Cl.
USPC .......................................................... 707/694

(58) Field of Classification Search
USPC ........................................... 707/694; 709/206
See application file for complete search history.

(56) References Cited

U.S. PATENT DOCUMENTS

| | | | |
|---|---|---|---|
| 6,324,569 B1 | 11/2001 | Ogilvie et al. | 709/206 |
| 6,430,604 B1 * | 8/2002 | Ogle et al. | 709/207 |
| 6,466,969 B1 * | 10/2002 | Bunney et al. | 709/206 |
| 6,487,586 B2 | 11/2002 | Ogilvie et al. | 709/206 |
| 6,560,318 B1 * | 5/2003 | Spielman et al. | 379/88.12 |
| 6,701,347 B1 * | 3/2004 | Ogilvie | 709/206 |
| 6,711,608 B1 * | 3/2004 | Ogilvie | 709/206 |
| 7,133,901 B1 * | 11/2006 | Dalby et al. | 709/206 |
| 7,216,145 B2 * | 5/2007 | Collings, III | 709/206 |
| 7,650,337 B2 * | 1/2010 | Cox | 707/783 |
| 7,764,772 B2 * | 7/2010 | Weksel | 379/114.13 |
| 7,773,729 B2 * | 8/2010 | Rodkey et al. | 379/37 |
| 7,865,563 B2 * | 1/2011 | Moudy et al. | 709/206 |
| 7,961,110 B2 * | 6/2011 | Lemmon | 340/573.1 |
| 8,102,245 B2 * | 1/2012 | McCarthy et al. | 340/286.05 |
| 8,234,676 B2 * | 7/2012 | Klein et al. | 725/58 |
| 2003/0217109 A1 * | 11/2003 | Ordille et al. | 709/206 |
| 2004/0059790 A1 * | 3/2004 | Austin-Lane et al. | 709/207 |
| 2004/0161080 A1 * | 8/2004 | Digate et al. | 379/88.17 |
| 2005/0068167 A1 | 3/2005 | Boyer et al. | 340/531 |
| 2005/0256931 A1 * | 11/2005 | Follmeg et al. | 709/206 |
| 2006/0149816 A1 * | 7/2006 | Cadiz et al. | 709/206 |
| 2006/0195591 A1 * | 8/2006 | Kim et al. | 709/227 |
| 2007/0077045 A1 * | 4/2007 | Kato | 396/17 |
| 2007/0202884 A1 * | 8/2007 | Nykanen et al. | 455/455 |
| 2007/0299927 A1 | 12/2007 | Knauerhase | 709/206 |
| 2008/0194236 A1 * | 8/2008 | Johns | 455/412.2 |
| 2008/0209280 A1 * | 8/2008 | Dilillo et al. | 714/48 |
| 2009/0131088 A1 * | 5/2009 | Kirchmeier et al. | 455/466 |
| 2010/0306322 A1 * | 12/2010 | Conahan | 709/206 |

* cited by examiner

Primary Examiner — Jeffrey A Burke
(74) Attorney, Agent, or Firm — Sunstein Kann Murphy & Timbers LLP

(57) ABSTRACT

Users of an office-based computer system are prompted to check in upon system login. An office notification message is created that includes a recipient group and an expiration. The notification message is sent only to checked-in members of the recipient group. After the notification message expires, it is deleted from the recipients' mailboxes. A reply message may be created by a notification message recipient and sent to the recipients of the original notification message. The reply message inherits the expiration of the original notification message and is deleted upon expiration.

24 Claims, 11 Drawing Sheets

*Fig. 6*

OFFICE-BASED NOTIFICATION MESSAGING SYSTEM

CROSS REFERENCE TO RELATED APPLICATIONS

This application claims the benefit of U.S. Provisional Patent Application No. 61/146,517, filed Jan. 22, 2009 titled "Office-Based Notification Messaging System," the entire contents of which are hereby incorporated by reference herein, for all purposes.

TECHNICAL FIELD

The present invention relates to office-based messaging systems, and more particularly to an office-based messaging system that creates and automatically deletes messages having short-lived relevancy.

BACKGROUND ART

Office-based messaging systems are currently in use in which a message can be sent to a specific group of recipients in a company to whom the message has relevance. A group can be defined by an individual for personal use, at a system level for use by all users, or at an intermediate level, such as for use within an organizational department. The sender need only specify the group name in the message "To:" field, and the messaging system will resolve the group name into the list of individual recipients that comprise the group, and the message will be sent to the group members. In addition, certain messaging systems allow the message sender to specify a message expiration. For example, Microsoft Office Outlook allows a message sender to specify an "Expires After:" date and time. Microsoft and Outlook are registered trademarks of Microsoft Corporation. A message in an Outlook recipient's inbox that has "expired" will appear, for example, with a red line through the message on the next screen refresh after the expiration time. A batch process might run once a day that will move expired messages from recipients' inboxes to their "deleted" folders.

It is also known to route messages based on "presence" information. For example, U.S. Patent Publication 2007/0299927 to Knauerhase describes a system that maintains a user profile that includes preference by priority as to which "channels" the user wishes to receive messages, and also accessibility states as to those channels. Channels might include email, landline and cell phones, instant messaging accounts, PDA's, etc. For example, a user's preferences may be defined such that messages are received first by email, and then by cell phone. If the user is unavailable via email, then messages will be routed to the user's cell phone. A store-and-forward system, such as email, can be used as a fall-back if a user is unavailable by any of the channels the user has specified.

SUMMARY OF THE INVENTION

The invention is directed generally to methods and systems for sending an office notification message to users of an office-based computer system. According to aspects of this method, notification messages can be created having short-lived relevance for recipients of a selected group who are currently in the office. Examples of such messages include "Looking for Joe," "Do Not Use the Big Job Printer," and "Bagels are Here." Such notification messages may advantageously be automatically deleted from the recipient's inbox after a short expiration interval specified by the notification message sender. The messages may be delivered advantageously only to members of the selected recipient group who are in the office when the message is sent or who log-in at the office before the message expires. Further, one is able to have a reply message sent to all those who were sent the notification message. The reply messages can conveniently inherit the expiration of the original notification message. For example, after a "Joe's Been Found" reply message is sent in response to a "Looking for Joe" notification message, neither the original "Looking For" notification message nor the "Been Found" reply message have relevance after a very short period, and all original notification messages and reply messages can be deleted from all recipient mailboxes.

An embodiment of the present invention provides a computer-implemented method for sending an office notification message to users of an office-based computer system is provided. An office-based computer system user is prompted to check-in upon login to the office-based computer system. A list of checked-in users is maintained, such as in a database. For example, an indication may be maintained in the office-based computer system of which users are checked-in, based on responses by users to the prompting. An office notification message is created that includes a recipient group and an expiration time. The notification message is then sent only to checked-in members of the recipient group. Upon expiration, the notification message is automatically deleted from message recipient mailboxes.

The method may include prompting only users who log-in locally to check-in, so that remote users do not receive the notification messages. The method may include automatically selecting recipients for the notification message, based on the recipient group and on the indication of which users are checked-in, and sending the office notification to the automatically selected recipients. The method may also include sending the notification message to members of the recipient group who check-in after the message was originally sent, but before the notification message expires. The members of the recipient group may be determined based at least in part on user identity.

Users of the office-based computer system may log in to computer workstations. Membership in the recipient group may be determined at least in part on attributes of the computer workstations of logged-in users. A recipient group may include members of an organizational department, members of a group, users of a certain printer, users located in a certain geographic location, users located in a certain area of a facility, users selected by the sender or combinations thereof. The expiration time may be selected based on a time interval after the notification message is sent or on a user input. The office notification message may be an email message, a voicemail message, an SMS message or the like.

Another embodiment of the present invention provides a computer-implemented method for replying to a received office notification message is provided. After receiving an office notification message that includes an expiration and a message recipient list, the recipient creates a reply message to the office notification message. In one embodiment, the reply message inherits the expiration of the original notification message. The reply message is then sent to the message recipients of the original notification message. The reply message is automatically deleted from reply message recipient mailboxes after the reply message has expired. The reply message may be automatically given an expiration based on the expiration of the original notification message. The method may include automatically setting the expiration of the reply message to an expiration based on when the reply message is sent. The method may also include resetting the expiration of the notification message to an expiration based on when the reply message is sent.

Yet another embodiment of the present invention provides a computer-implemented office notification system. An office-based messaging system is coupled to an office-based computer system. The office-based messaging system is configured to receive user input for creating an office notification message. The user input includes a user-selected messaging system user group of message recipients and an expiration. A check-in computer application is configured to execute on the office-based computer system. The check-in computer application prompts a user of the office-based computer system to check in upon computer system login. A database is coupled to the computer system and configured to store information about checked-in users. The check-in computer application is configured to update the database as users check in. The office-based messaging system is configured to compare the selected messaging system user group of message recipients to the information about checked-in users in the database. In addition, the office-based messaging system is configured to send the created office notification message to members of the selected message system user group of message recipients who are checked in.

The office-based messaging system may include recipient mailboxes to receive and store office notification messages. The office-based messaging system may be further configured to delete office notification messages from the recipient mailboxes after expiration. The check-in computer application may be configured to prompt only users of the office-based computer system who log-in locally to check-in.

Another embodiment of the present invention provides a computer program product for providing an office notification system on an office-based computer system. The computer program product may include a non-transitory computer-readable storage medium having computer readable program code stored on it. The computer readable program code may include program code for prompting a computer system user to check-in upon system login and for maintaining a list of checked-in users. Additional program code may create an office notification message including a recipient group and an expiration and send the created notification message to members of the recipient group who are checked-in. Yet additional program code may delete the notification message from message recipient mailboxes after the notification message has expired.

Optionally, program code may prompt only users who log-in locally to check-in and/or send the notification message to members of the recipient group who check-in before the notification message expiration but after the notification message was originally sent.

Yet another embodiment of the present invention provides a computer program product for replying to a received office notification message that includes an expiration and a message recipient list on an office-based computer system. The computer program product includes a non-transitory computer-readable storage medium having computer readable program code stored on it. The computer readable program code includes program code for creating a reply message to the received office notification message and for setting a reply message expiration. Additional program code sends the reply message to recipients of the office notification message and automatically deletes the reply message from reply message recipient mailboxes after the reply message has expired.

BRIEF DESCRIPTION OF THE DRAWINGS

The invention will be more fully understood by referring to the following Detailed Description of Specific Embodiments in conjunction with the Drawings, of which:

FIG. 6 shows a Microsoft Outlook user interface that incorporates an embodiment of the present invention;

DETAILED DESCRIPTION OF SPECIFIC EMBODIMENTS

Definitions. As used in this description and the accompanying claims, the following terms have the meanings indicated, unless the context requires otherwise:

The terms "office-based messaging system," "messaging system client," "office-based computer system," "office-based notification application" and the like refer to systems that support a defined entity that includes a plurality of system users. Such an entity might be a company, an organization or groups within a company or organization.

Figure 1:
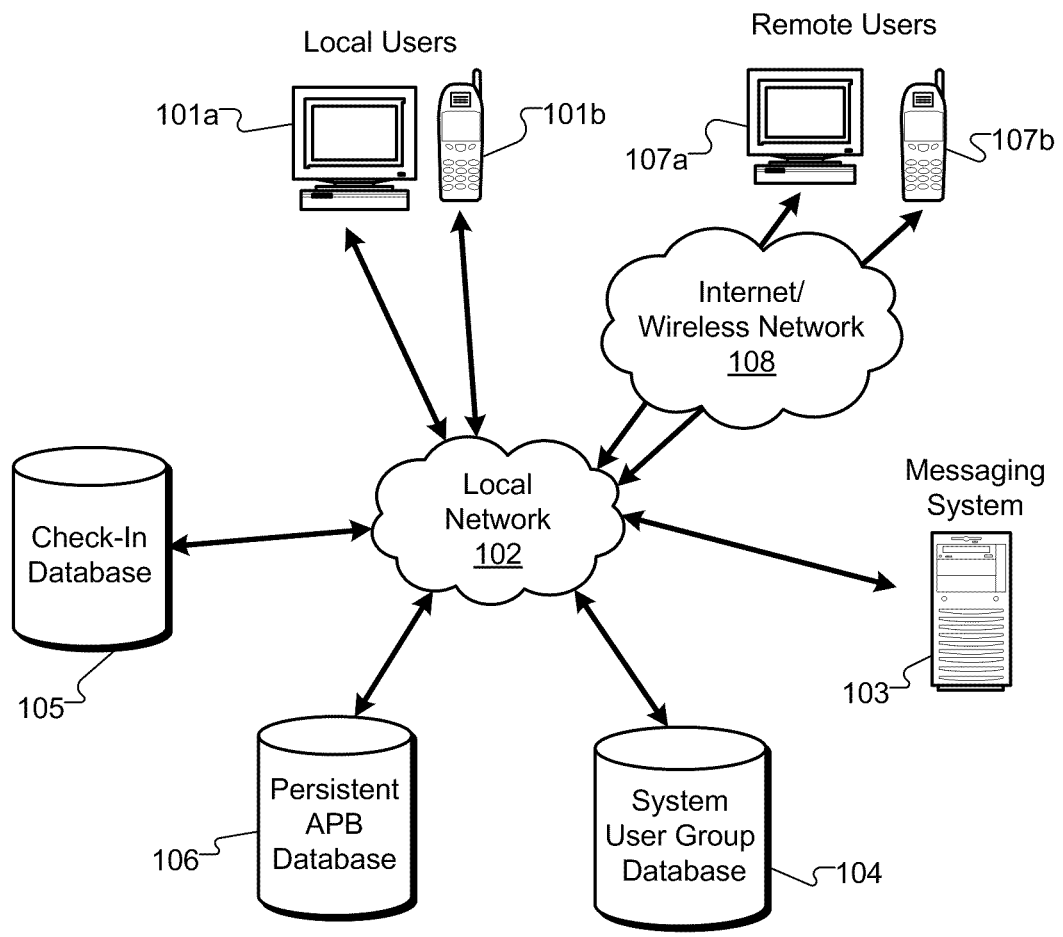
FIG. 1 is a block diagram illustrating components of an office-based computer system in which embodiments of the invention may be employed.

FIG. 1 is a schematic block diagram illustrating the functional components of an office-based computer system in accordance with an embodiment of the invention. Messaging system 103 comprises the logic, software and hardware necessary to support an office-based messaging system. Messaging system 103 typically comprises what is referred to as a company's email system, including the centralized email servers, related centralized functionality and related messaging system client functionality. The centralized functionality might include, for example, maintaining message distribution groups and a store-and-forward function for later delivery of messages sent to users who were not logged-in when the messages were sent. Messaging system 103 also includes an office-based notification application that operates with, or as an integral part of, the office-based messaging system. For ease of understanding, the office-based notification application can be considered to support features of the invention that are beyond those of a typical office-based messaging system. In an exemplary embodiment, the messaging system includes one or more Microsoft Exchange mail servers.

Local users 101a are local workstations to which computer system users log-in. The workstations typically are personal computers. A local workstation is normally associated with a fixed location, such as a user's office. However, users may generally log in to any local workstation using their system user identifications (typically usernames and passwords). At any given time, the number of users logged-in to local workstations may range from zero up to all local users eligible to log in. In an embodiment, the local workstations 101a include Microsoft Outlook client software. Local users may also include devices 101b, such as mobile phones, smart phones, PDA, or other wireless handheld devices, including, for example, the Blackberry devices by Research in Motion Limited and the iPhone mobile telephone by Apple Inc. Devices 101b include client software that operates with the centralized mail servers of messaging system 103 to send and receive messages, which may be in the form of, for example, email messages, voicemail messages or SMS text messages.

Remote users 107a include computer system users who are accessing the system from off-site, or remote, locations. Such remote users might include users accessing the computer system from home, from a Wi-Fi hotspot such as a coffee shop or an airport, or from a hotel while traveling. Remote users may also include devices 107b, such as mobile phones, smart phones, PDAs or other wireless handheld devices.

Typically, remote users will connect to the computer system via the Internet or a managed network 108. Both local users 101 and remote users 107 have access to messaging system 103. Such access typically is facilitated through distributed client software, such as, for example, Outlook. However, other suitable messaging systems may be used. Local network 102 is typically an office-based Local Area Network (LAN) that facilitates communication between the hardware and functional components of the office-based computer and messaging systems, including communication between centralized and distributed components of the office-based messaging system 103.

Check-In Database 105 is a database for maintaining a list of computer system users who have "checked-in." A Check In/Out application prompts computer system users upon system log-in if they would like to check in. The purpose of the Check In/Out application is to maintain a list of computer system users who are appropriate recipients of messages intended for those who are physically present in the office. As such, the system may be operated so that remote users 107 do not execute the Check In/Out application when they log in to the office-based computer system. The Check In/Out application updates Check-In Database 105 with the check-in status of system users. Such an application may also include functionality that allows a user to check-out and check-in during a workstation session if the user will be out of the office, for example, for lunch or other appointments. As explained more fully below, data in the Check-In Database 105 is used to limit the recipients of an office notification message to those checked-in at the time the message is originally sent, and may be used to allow users to receive an earlier-sent notification message when they later check in. In an embodiment of the invention, the Check In/Out application is a .NET application that is executed when a local workstation user logs in to the computer system.

The ability to create office-based notification messages intended for only those recipients physically in the office may be limited to those users physically present in the office. This may be done, for example, by having the messaging system client software recognize the user as being a remote user and not running the notification application on the remote user devices 107. Thus, the remote users will not be given the option to send office-based notification messages automatically limited in distribution to those physically present in the office.

System User Group Database 104 contains information about system user groups, and their associated group members, that are selected by a messaging system user as the recipient group of an office notification message. In an embodiment, many of the associations in database 104 of an individual system user to a user group are derived from static information in the office-based computer system's Windows Server 2003 Active Directory directory service by Microsoft. The remaining associations of users and groups are built dynamically upon the sending of the notification message. As an example of a static association based on data in Active Directory, database 104 contains associations of office floors to user IDs. When a notification message sender selects, for example, the recipient group "10th Floor Users," the individual recipients in the selected group are resolved through the floor-to-user identification (ID) association in the database 104. An example of a dynamic association is user IDs that are currently associated with a particular printer. A dynamic association is maintained in database 104 between user id and printer. This association is refreshed each time a user logs in. Active Directory contains a static association of computers and their associated printers. Upon user log in, the system updates the user's assigned printer by identifying the computer the user is logging in to in Active Directory and then writing the computer's assigned printer value to the user's record in database 104. When a notification message sender selects, for example, the recipient group "Color Printer 1 Users," i.e., all users currently assigned to the printer "Color 1," the individual recipients in the selected group are resolved through the database 104 dynamic association Color 1-to-user ID.

Persistent APB Database 106 relates to a feature of the present invention, more fully described below, that allows users to receive earlier-sent office notification messages as they log in. To briefly summarize, when a notification message is defined as "Persistent" when it is created, the message and a list of all recipients who were not checked in when the message was sent (as determined from Check-in Database 105) is stored in Persistent APB Database 106. Periodically, the list of recipients who were not checked in when the message was sent is compared to the current list of checked-in users in Check-in Database 105. If a recipient who was not present in Check-in Database 105 when the message was sent is now present, the message stored in Persistent APB Database 106 is sent to the newly checked-in recipient. A notification message and its recipient list is deleted from Persistent APB Database 106 after the message has expired.

In a preferred embodiment of the invention, System User Group Database 104, Check-In Database 105, and Persistent APB Database 106 are various tables in a single SQL database. However, other database system architectures and products may be used.

Figure 2A:
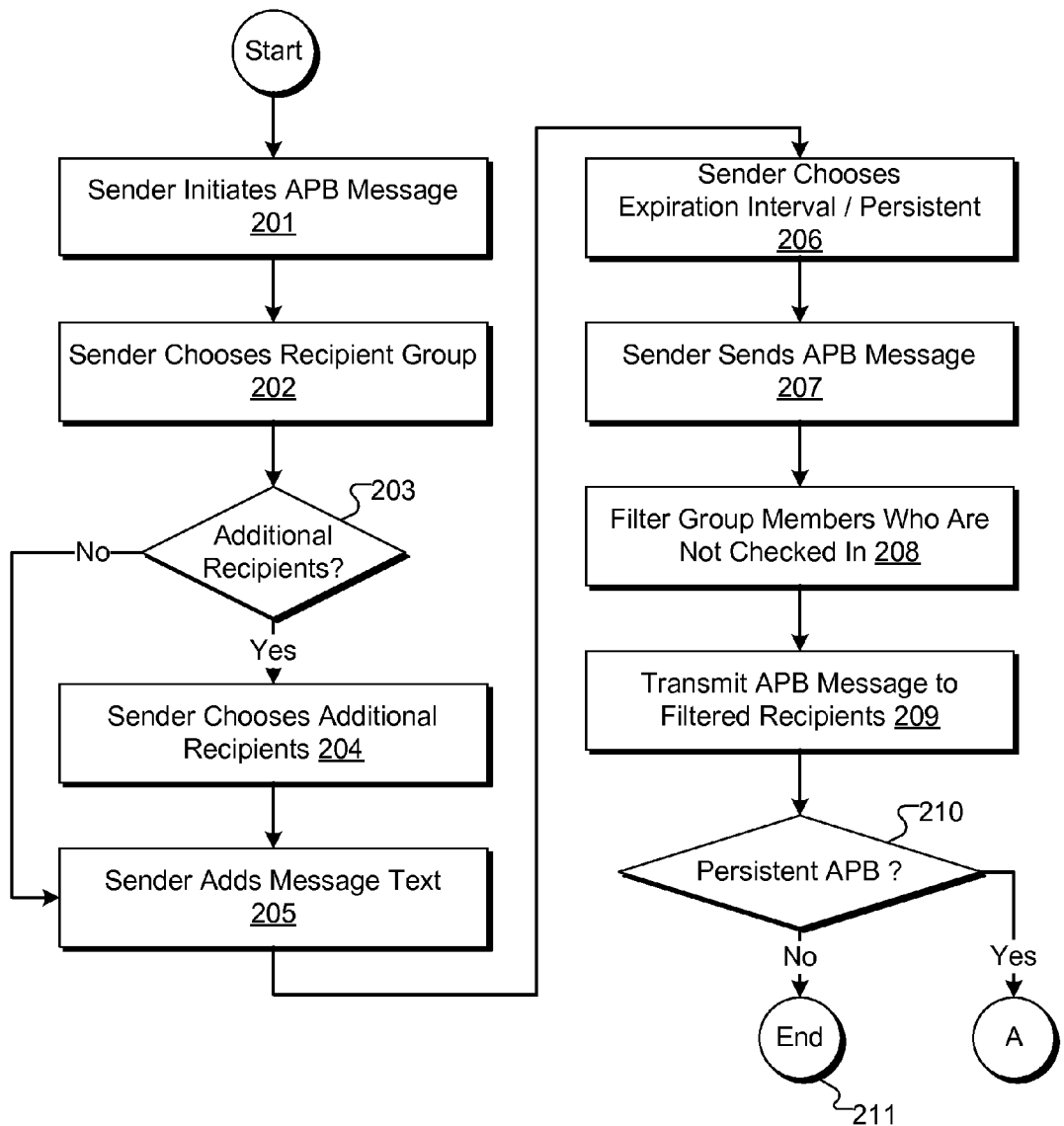
FIGS. 2A and 2B show a flow chart of a method for sending an office notification message according to an embodiment of the present invention.
Figure 2B:
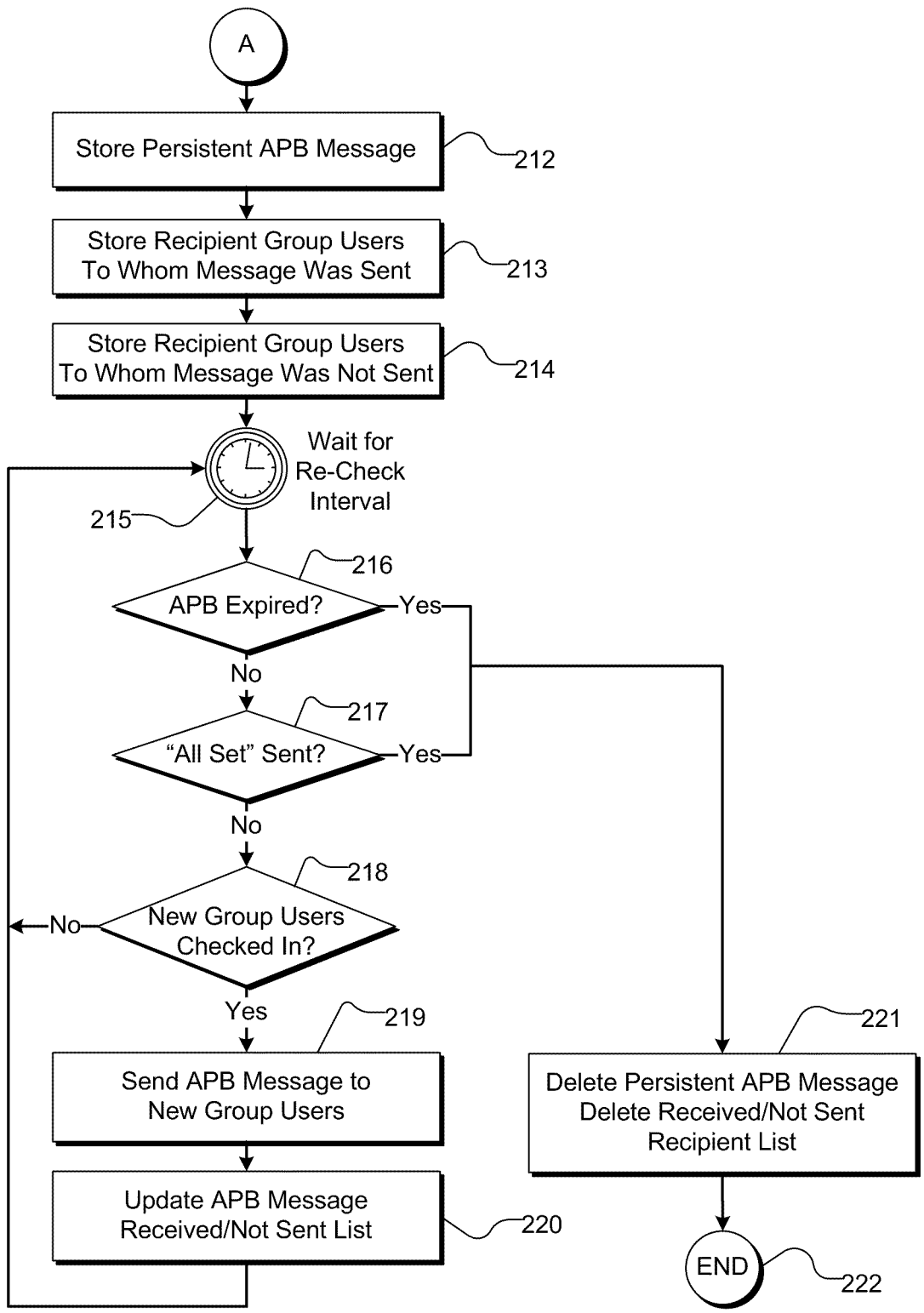

In accordance with an embodiment of the present invention, a user can create an office notification message, including a designated recipient group and an expiration, and direct the messaging system to send the message. In accordance with a preferred embodiment of the present invention, a method for creating and sending an office-based notification message is shown in FIGS. 2A and 2B. A notification message sender first initiates creating the office notification message 201. This is done, for example, by selecting an option within the messaging system client program on the sender's workstation 101a that executes the office-based notification application. The sender then chooses 202 a recipient group to receive the notification message. The recipient group is selected from one of the groups defined in System User Group Database 104. After a recipient group has been selected, the sender has the option 203 of adding additional recipients by name 204. The additional recipients are selected from contact lists or address books available to the messaging system client program on the sender's workstation 101a. After the sender has selected all desired recipients of the notification message, the sender adds 205 subject and message body text to the notification message.

The sender then chooses 206 a notification message expiration interval for the notification message. As will be explained in more detail below, the expiration interval is used to set a time after which the notification message will be deleted from a recipient's messaging system. The user may also define the message as "persistent" 206. The sender then directs the messaging system client to send 207 the message.

Figure 14:
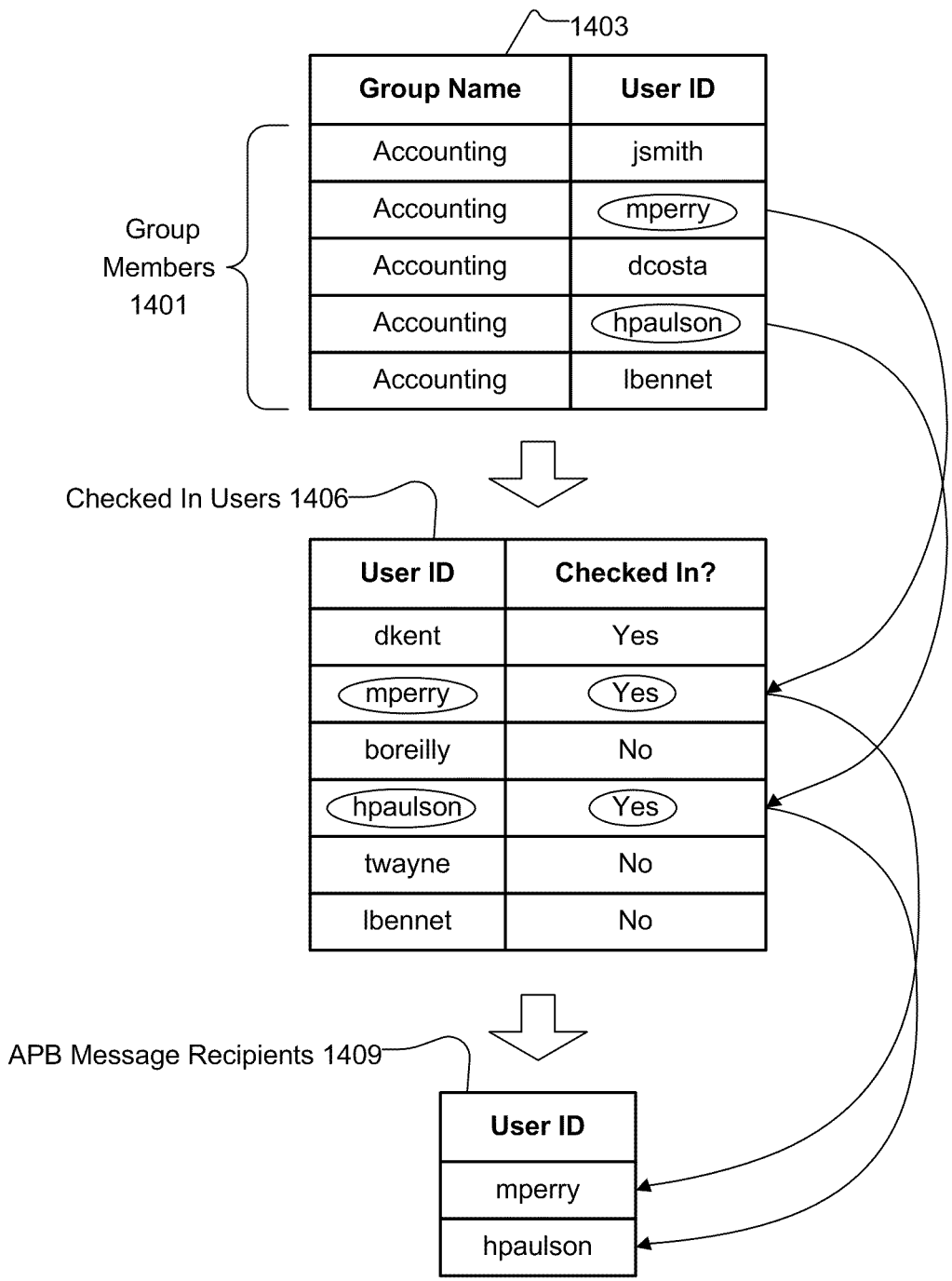
FIG. 14 is a schematic diagram illustrating group and checked-in user filtering, according to an embodiment of the present invention.

After the sender directs the messaging system to send the message 207, the notification application expands the selected recipient group into its individual recipients, and then compares the individual recipients to the users in the Check-In Database 105 who are checked-in. Individual recipients who are not checked in are filtered 208 from the notification message recipient list. For example, as schematically exemplified in FIG. 14, assume the sender selected "Accounting" as the recipient group. Members 1401 of the Accounting group 1403 may be identified. Then, these members 1401 may be compared to a list 1406 of checked-in users. Accounting group members who are checked in may be used to populate a list 1409 of APB message recipients.

Returning to FIG. 2, in one embodiment, individual recipients that are specifically added as additional recipients 204 will not be filtered, even if they are not checked-in. The messaging system then transmits 209 the notification message to the resultant list of recipients. At 210, if the sender does not define the message as persistent 206, then sending the notification message is complete and the routine exits 211.

However, at 210, if the sender has defined the message as persistent 206, then the notification application stores 212 the message in Persistent APB Database 106. In addition, the notification application stores 213 in Persistent APB Database 106 the list of individual recipients from the recipient group that were filtered 208 and did not receive the notification message, and stores 214 in Persistent APB Database 106 the list of individual recipients from the recipient group to whom the notification message was sent 209.

After storing 212-214 the persistent message and the individual recipients who did and did not receive the notification message, the notification application waits 215 for a predetermined persistent message re-check interval. In an embodiment, the re-check interval can be defined at an application level based on considerations relating to workstation performance. In one embodiment, the recheck interval is about ten seconds. After the re-check interval, the expiration time of the stored persistent notification message is checked 216 against the system time. If the stored persistent notification message has not expired 216, and an "All Set" reply message (explained below with regards to FIG. 4) has not been received 217, then it is determined 218 whether any of the individual recipients who have not received the persistent notification message are now checked-in. The list stored 214 in the Persistent APB Database 106 of individual recipients from the recipient group who were filtered 208 because they were not checked in and did not receive the notification message is compared to the current list of checked-in users in Check-In Database 105. If additional individual recipients from the recipient group have checked in since the last check, the notification application re-assembles the notification message based upon message information stored 212 in Persistent APB Database 106. It then directs the messaging system client to send the notification message 219 to these additional individual recipients. The list stored in Persistent APB Database 106 of recipients who have and have not received the persistent notification message is updated 220, and the notification application again waits 215 for a re-check interval.

If at 216 the persistent notification message has expired, or if at 217 an "All Set" reply message has been received by the originator 307 (described below) in response to the notification message, as indicated by the persistent message being marked for deletion 309 (described below), the stored message along with the stored lists of individual recipients who did and did not receive the message are deleted 221 from Persistent APB Database 106. The notification application then exits 222 the send notification message routine.

Figure 3:
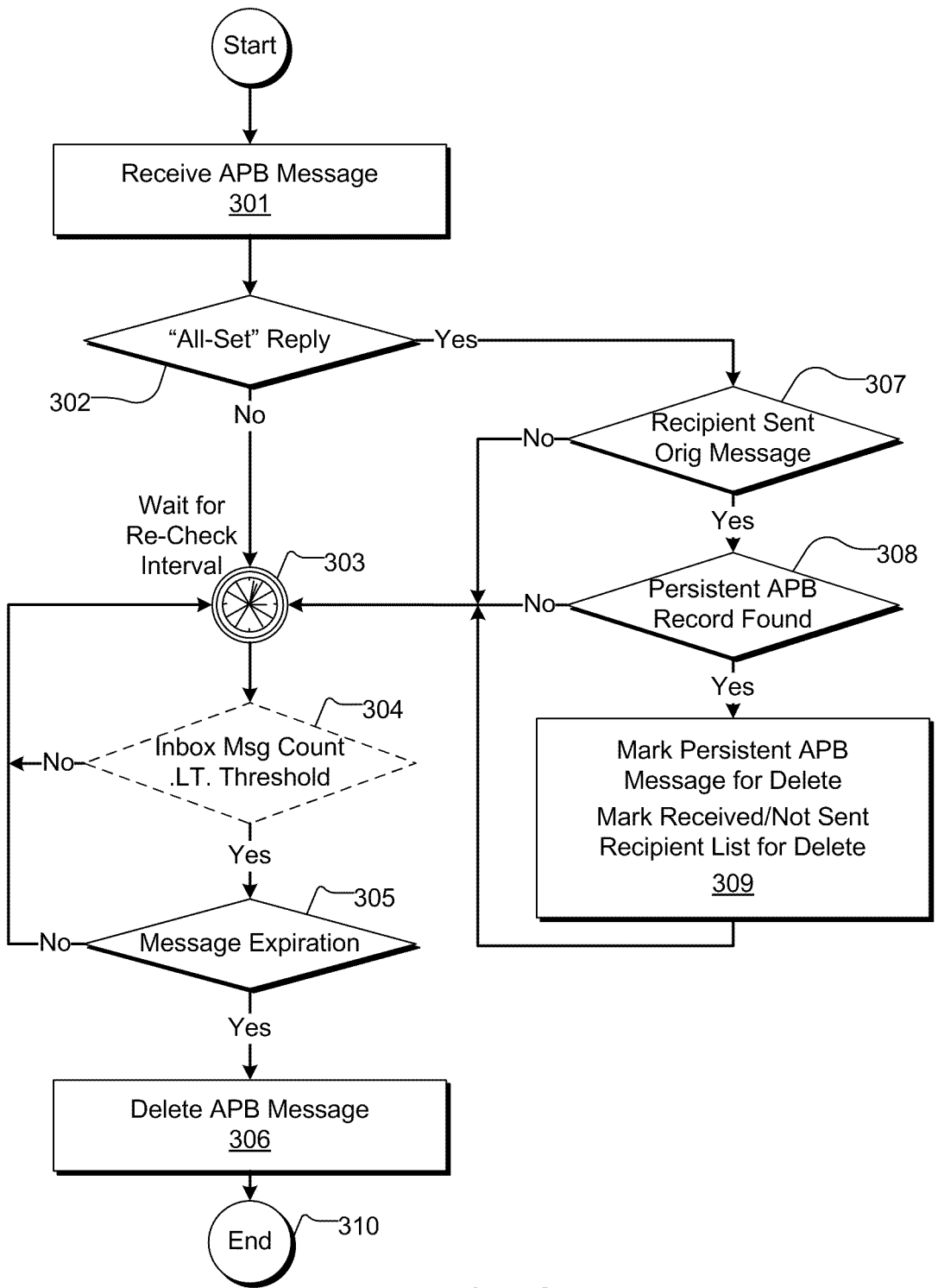
FIG. 3 shows a flow chart of a method for receiving an office notification message according to an embodiment of the present invention.

In accordance with an embodiment of the present invention, a user receives an office notification message having an expiration, and the notification message is deleted from the user's messaging system when the message expires. In accordance with an embodiment, FIG. 3 shows a flow chart of a method by which a recipient receives an office-based notification message and the message is deleted after expiration. After the notification message is sent 209/219 (FIG. 2), the message is received 301 by the recipient's messaging system client and is available for the recipient to read. If at 302 the notification message is not an "All Set" reply message, then, after an expiration re-check interval 303, the message is checked 305 by the notification application to see if it has expired. To determine if the notification message has expired, the expiration time is compared with the current system time. If the expiration time is earlier than the current time, the message has expired. If the notification message has expired, then the notification application directs the messaging system client to delete 306 the message from the recipient's messaging system.

If at 302 the received message is an "All Set" reply message to an earlier notification message, then the notification application determines 307 whether the recipient of the "All Set" message is also the originator of the notification message to which the "All Set" message relates. If so, then Persistent APB Database 106 is checked 308 to determine if the notification message is stored in Persistent APB Database 106. If the notification message is stored in Persistent APB Database 106, then the message record and the lists of recipients who have and have not received the persistent notification message are marked for deletion 309 from Persistent APB Database 106. As indicated above, the deletion 221 (FIG. 2) from Persistent APB Database 106 of the persistent message record and the recipient lists takes place as part of the process of checking and sending the persistent notification message to recipients who have checked in after the original message has been sent. In this manner, after an "All Set" reply message has been received by the originator in response to the persistent notification message, persistent notification messages are not sent to individual recipients in the selected recipient group list to whom the message has not yet been sent. In an embodiment, deletion 309 of the persistent notification message and the recipient lists from Persistent APB Database 106 occurs only when the originator of a persistent notification message receives an "All Set" reply to the notification message or if the persistent notification message has expired. However, deletion of both the persistent notification message and the recipient lists from Persistent APB Database 106 may be triggered by other events. For example, deletion may be triggered when any recipient of a persistent notification message sends an "All Set" reply message, without regard to whether the "All Set" message is received by the sender. The decision as to what event, if any, triggers deletion of the persistent notification message and the recipient lists from Persistent APB Database 106 is a system design choice.

In an embodiment, the expiration recheck (303) occurs periodically with the re-check interval based on considerations related to workstation performance. The start of the first interval may occur, for example, when the notification application is started on a user's workstation. In an embodiment, an optional test 304 may be performed by the notification application to determine if the number of messages in a recipient's inbox exceeds a threshold number, and if so, to skip determining 305 if any notification messages have expired. In certain implementations on certain messaging systems, the workstation resources required to identify a notification message in a user's inbox, and then to determine if any messages have expired, is a function of the number of messages in the recipient's inbox. With such messaging systems, a user's workstation may momentarily "hang" while the notification application determines 305 if any notification messages have expired. In an embodiment, determining 305 if a notification message has expired is skipped if the notification application calculates 304 that the number of messages in the user's inbox exceeds a threshold number. In this case, notification messages will not be deleted 306. In some embodiments, when an "All Set" reply message is received, the expiration of the original notification message or the reply message can be set to, for example, the current time plus 10 minutes.

Figure 4:
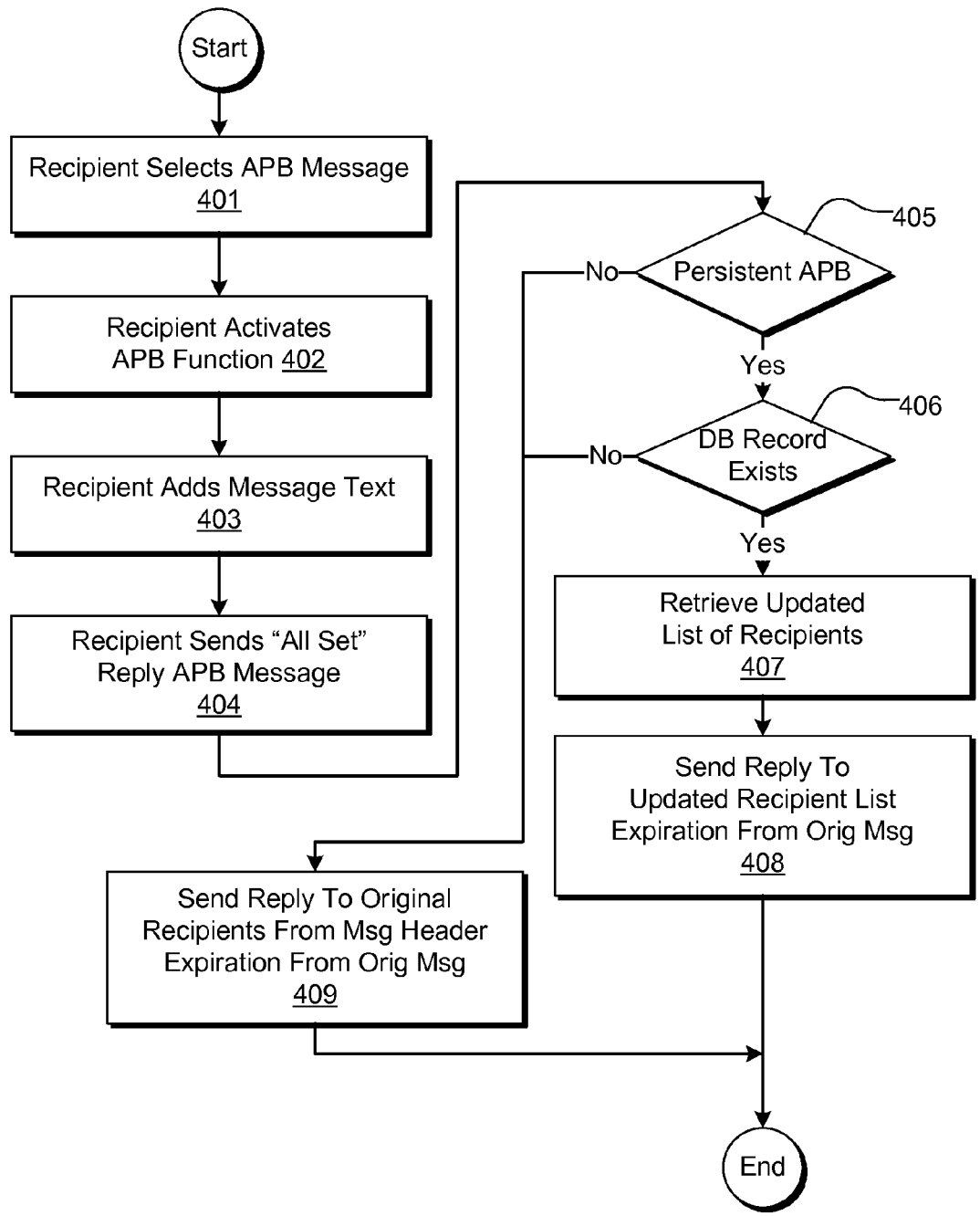
FIG. 4 shows a flow chart of a method for replying to an office notification message according to an embodiment of the present invention.

In accordance with an embodiment of the invention, a user creates a reply message to an office notification message, including an expiration, and sends the reply message to all recipients of the notification message. In accordance with a preferred embodiment of the invention, a method for replying to an office-based notification message is shown in FIG. 4. In the messaging system client, the recipient selects 401 an office notification message, and activates 402 the notification message "All Set" reply function. The recipient may optionally add message text 403 to the "All Set" reply message. The recipient then directs the notification application to send 404 the reply message. If at 405 the notification message being replied to is not a persistent notification message, or if at 406 the replied to message is a persistent notification message but a Persistent APB Database 106 record does not exist, then the notification application directs the messaging system to send the reply message 409 to the individual recipients of the original message, as typically determined, for example, by the recipients in the "To:" field of the original message. However if at 405 the notification message being replied to is a persistent notification message, and if at 406 a persistent message record exists in Persistent APB Database 106, then the associated updated list of recipients 220 who have received the original notification message is used 407 as the recipient list for the reply message. The expiration time from the original notification message is copied 408 by the notification application into the reply message, and the notification application directs the messaging system to send the reply message using the updated recipient list. In other embodiments, the expiration time of the reply message may be determined by adding, for example, 10 minutes to the current time. Also, when the reply message is sent, the expiration time of the original notification message may be set to a time in the future, for example, to the current time plus 10 minutes.

In accordance with an embodiment of the invention, the disclosed office-based notification application may be implemented as an integration to Microsoft Office Outlook 2003 using Microsoft's .NET Visual Studio Tools for Office (VSTO) set of class libraries in concert with the native Microsoft Office Outlook object model. This embodiment takes advantage of several application programming interface components available for custom feature development, including a standard or predefined insertion point within Microsoft Office Outlook for VSTO add-ins, the ability to design a set of custom graphical user interface forms equipped with pre-built controls, the tools required for accessing external data stored within the local file system and networked database management systems (DBMS), and the ability to append metadata to the Outlook MailItem object using user-defined fields. Metadata is additional information specific to the notification application that is appended to the notification message by the notification application. This metadata, once added to the notification message, is used to provide necessary information, such as the message's expiration time, to the notification application. Although some embodiments may be implemented using Outlook as the messaging system client, other embodiments may be implemented in other messaging systems. While the disclosed embodiment is implemented in a messaging system client running on a Microsoft Windows based computer, the other embodiments may be implemented on messaging system clients that run on other devices, such as mobile phones, smart phones, PDAs or other wireless handheld devices, including, for example, the Blackberry wireless device by Research in Motion Limited or the iPhone mobile telephone by Apple Inc.

Figure 5:
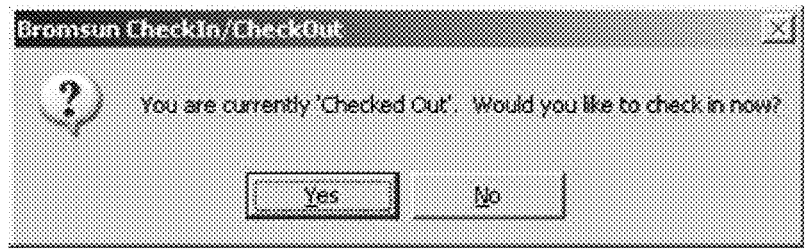
FIG. 5 shows a Check In/Out application user interface according to an embodiment of the present invention.

In accordance with an embodiment of the invention, a Check In/Out application user interface is shown in FIG. 5. When a local computer system user logs-in, the Check In/Out application prompts the user to check in via this user interface. All checked-in users are so indicated in the Check-In Database 105. When the local computer system user logs out, the Check In/Out application prompts the user to check out before the computer shuts down or restarts.

Figure 6:
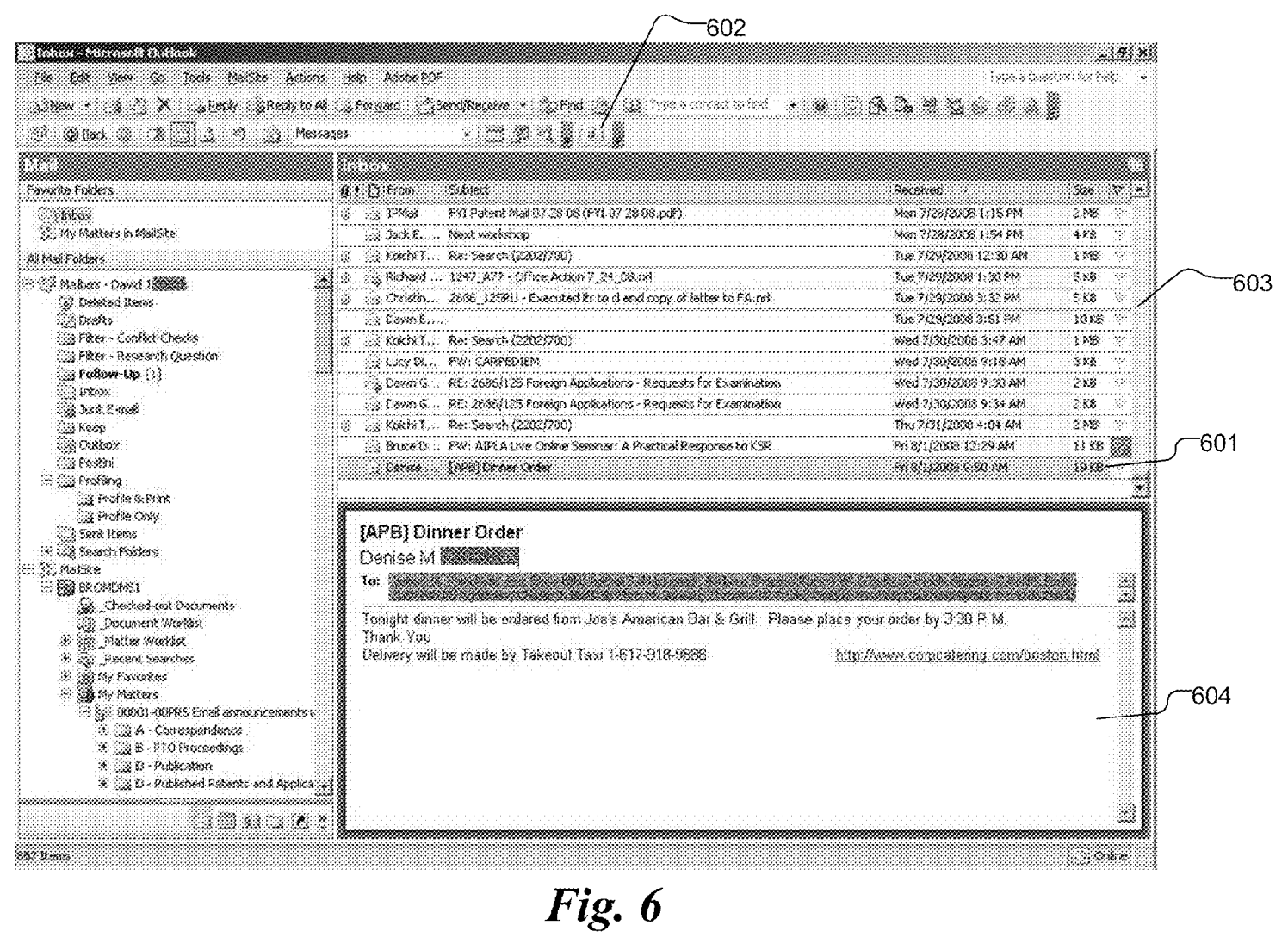

In accordance with an embodiment of the invention, the Mail Inbox user interface of Microsoft Outlook may be modified as shown in FIG. 6. When a user starts the Outlook application, Outlook triggers the startup event for each installed add-in. In an embodiment, the office-based notification application is controlled by a VSTO-based Outlook add-in, which is triggered upon starting Outlook. When the office-based notification application add-in startup event is triggered, the notification application creates the notification messaging toolbar in the Outlook Explorer window, adds needed metadata fields to the Inbox folder, (explained below in relation to FIG. 11) and then passes control back to Outlook.

FIG. 6 shows an example of an office notification message 601 in the Outlook Explorer inbox message list window 603. In this example, the sender of the notification message 601 is requesting dinner orders for those message recipients who will be working late at the office. The office notification message 601 is highlighted (selected), as indicated by the shaded background of the message entry in the Inbox message list window 603 and the message body text being displayed in the reading pane 604. An example of a notification message messaging system toolbar command bar button 602 is also shown. In accordance with an embodiment of the invention, clicking on the notification message button 602 causes the notification application to display various user interface forms that allow the messaging system user to begin the process of creating a notification message (201), FIG. 2 or replying to a notification message (402), FIG. 4. The messaging system toolbar showing notification message button 602 is loaded and displayed in the Outlook Inspector windows, which are opened when an Outlook Explorer window inbox message is opened by, for example, double-clicking on the message. In an embodiment, this button icon is selected from the available Microsoft Office command bar button icons. In other embodiments, the button icon may be custom generated.

Figure 7:
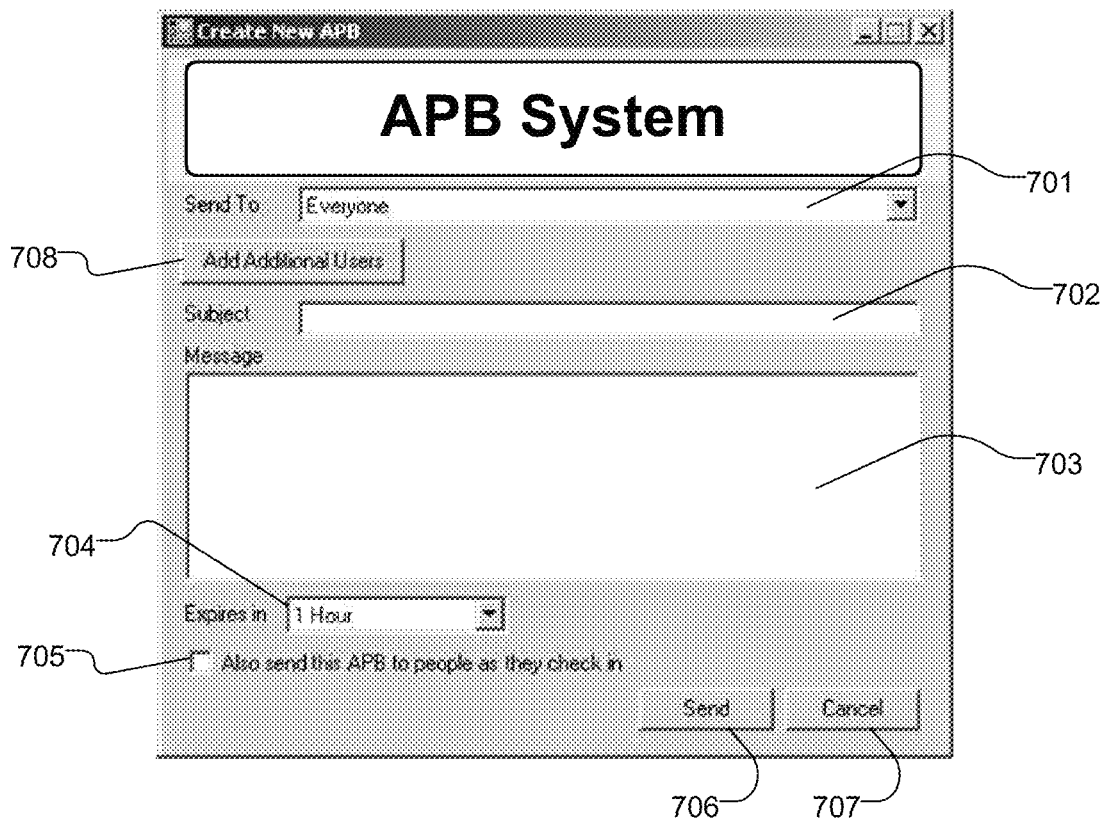
FIG. 7 shows a create message user interface form that is displayed when a user selects the "create notification message" function according to an embodiment of the present invention.

In accordance with an embodiment of the present invention, FIG. 7 shows a create message user interface form that allows a user to enter the information required for the creation of a notification message, including a designated recipient group and an expiration, and to direct the messaging system to send the message. The user interface form of FIG. 7 is loaded and displayed by the notification application when a user clicks (201), FIG. 2 on the notification message button 602 of FIG. 6. The user interface form allows the user to select a recipient group (202) via a "Send To" drop-down menu 701. The user also has the option to specify additional message recipients by name (204) by selecting the "Add Additional Users" button 708. The user may enter (205) a message subject in Subject text entry box 702, and message body text may be entered in text entry box 703. The user selects an expiration interval (206) from the "Expires In" drop-down menu 704. The sender has the option, by selecting box 705, to identify the message as "persistent" (210). After all information is entered into the form, the user clicks (207) on the "Send" button 706. The notification application then directs the messaging system client to create and send a notification message based on the entered information. The user also has the option to cancel out of the create notification message function altogether by selecting the "Cancel" button 707. In an embodiment, this form and the forms discussed below, in relation to FIGS. 8-10, may be designed using Visual Studio.

In accordance with an embodiment, notification messages are easily identified by the user within a messaging system user's mailboxes by having a certain character string automatically prepended to the subject of the notification message when the message is sent. For example, the character string "[APB]" may be used in all notification message subject lines, as shown for office notification message 601 of FIG. 6.

Figure 8:
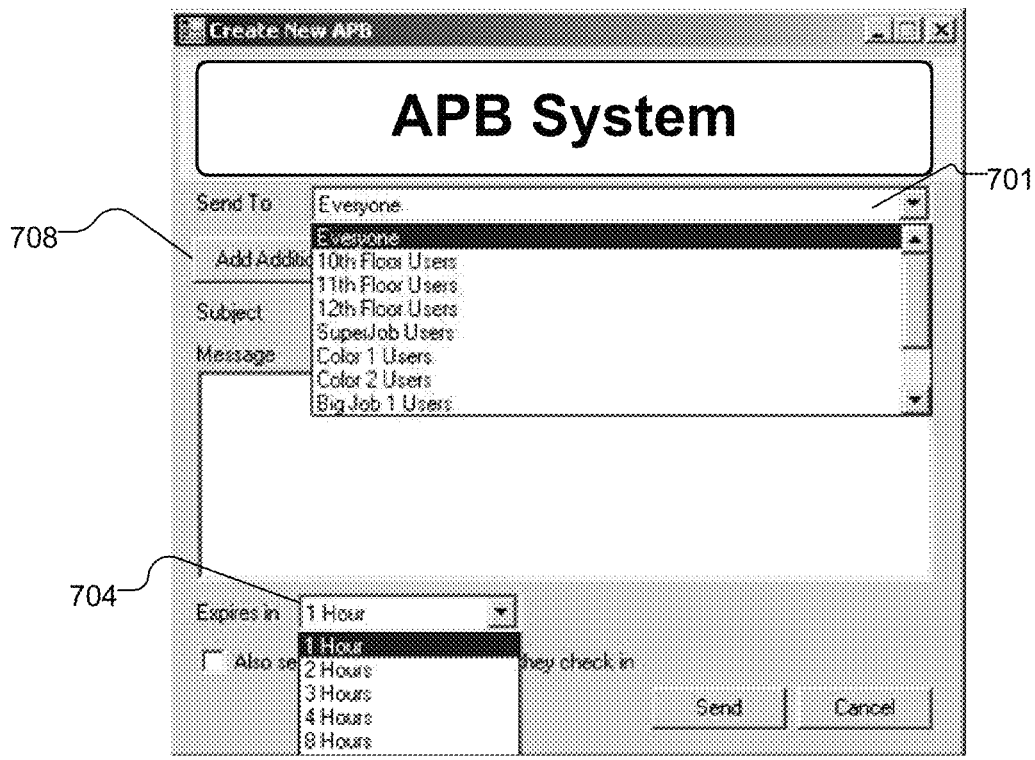
FIG. 8 shows the user interface form of FIG. 7 with group selection and expiration drop down menus displayed.

FIG. 8 shows the user interface form of FIG. 7 with the "Send To" drop-down menu 701 and the "Expires In" drop-down menu 704 displayed in expanded form. With each menu, clicking in the drop-down box 701 or 704 causes the respective menu to be expanded. In an embodiment, the list items in the "Send To" drop down menu are added to the list when the form is loaded for display. These items are read from System User Group Database 104. Although not shown in the figures, selecting the "Add Additional Users" button 708 results in opening a user selection window displaying, for example, all messaging system users and allowing the sender to select one or more of the displayed users by name to include as additional recipients (204) of the notification message.

Once a notification message has been received by a recipient, the recipient has several options available for replying to the message. One option is to reply to the message as one would reply to other non-notification messages. For example, a recipient may select or open the notification message and choose a delivery option, such as "reply," "reply all" or "forward." This typically results in a new reply message being created that allows the recipient to enter message body text into the reply message. The recipient then "sends" the reply message, and the messaging system distributes the reply message in accordance with the selected delivery option. This method of replying to a message is well known and will not be discussed further.

Figure 9:
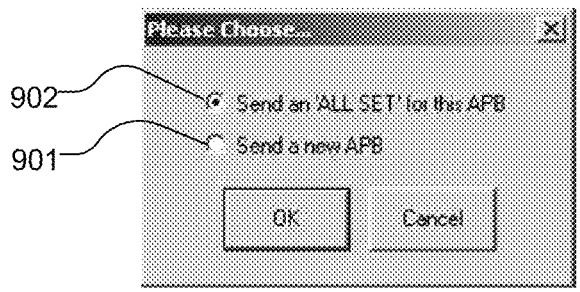
FIG. 9 shows a user interface form that allows a user to choose between replying to an office notification message, and creating a new notification message according to an embodiment of the present invention.

In an embodiment of the invention, the create notification message form illustrated in FIGS. 7 and 8 is loaded and displayed when the notification message icon 602 on the messaging system client toolbar menu is selected. However, if the notification message icon 602 is selected while an office notification message is highlighted, such as notification message 601, the notification application determines whether the user wishes to reply to the highlighted notification message or the user wishes to send a new notification message. In this instance, the "Please Choose" user interface form shown in FIG. 9 is displayed. If the recipient selects the "Send a new APB" button 901, the user interface form of FIGS. 7 and 8 is displayed, and the user may create a new notification message. On the other hand, if the recipient selects the "Send an 'ALL SET' for this APB" button 902, the user interface form of FIG. 10 is displayed, and the user may create a reply message to a received notification message.

Figure 10:
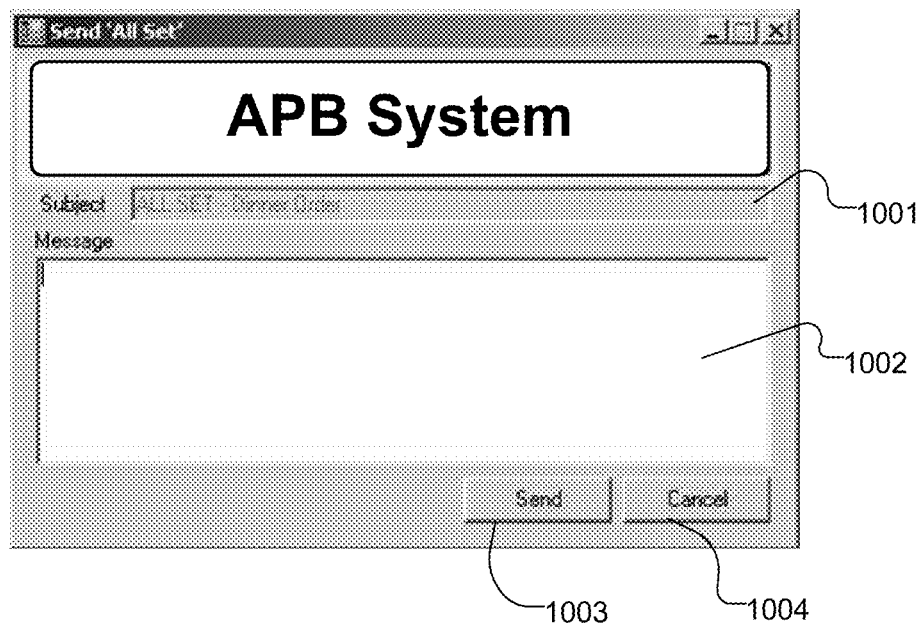
FIG. 10 shows a create reply message user interface form that allows a user to reply to an office notification message according to an embodiment of the present invention.

In accordance with an embodiment of the present invention, FIG. 10 shows a create "All Set" reply message user interface form that allows a user to reply with an "All Set" reply message to an office notification message. The user interface form of FIG. 10 is loaded and displayed by the notification application when a user selects a notification message (401), for example message 601 of FIG. 6, and clicks (402) on the notification message button 602 of FIG. 6. This user interface form allows the recipient to enter reply message body text (403) into text box 1002. The reply message subject 1001 is automatically filled in, based on the subject 702 of the notification message that has been selected for reply. The recipient may choose to send the reply message (404) by selecting the "Send" button 1003, or the recipient may cancel out of the reply function altogether by selecting the "Cancel" button 1004.

In general, how to trigger the create notification message dialogue is a design decision, and methods other than the above-described embodiments may be used within the scope of the present invention. For example, creation of a notification message may begin based on selection of a menu item from the File drop-down menu from a mailbox display screen or a new message creation screen. Also, the layouts of the create notification message and the create reply message user interface forms of FIGS. 7 to 10 is are design decisions, and any user interfaces that allow for the functionality described above may be used. A create notification message user interface should allow the user to: identify the message notification message; identify subject and/or message body text; indicate an expiration; and, optionally, identify the message as persistent. A create reply message user interface may allow the user the option to at least enter message body text.

Figure 11:
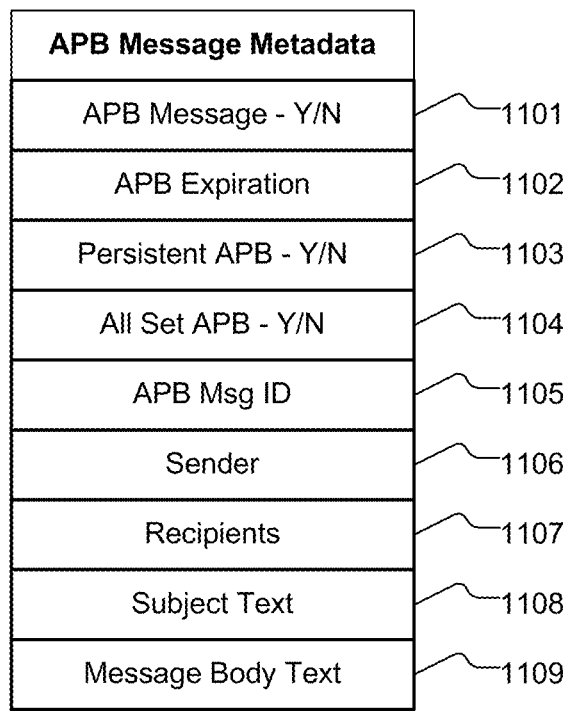
FIG. 11 shows notification message metadata in accordance with an embodiment of the invention.

In accordance with an embodiment, information in the form of metadata is stored as user-defined fields of the notification message Outlook mail item object. This metadata is used to provide information, such as the message's expiration time, to the notification application. FIG. 11 shows an example of notification message metadata stored in a notification message Outlook mail item. APB Message 1101 may be a Boolean variable. This field indicates whether the message is a notification message. APB Expiration 1102 is a date/time value. This is determined during notification message creation 206/704 and, in the case of a reply message, may be populated with the expiration from the original notification message 409. Persistent APB 1103 can be a Boolean value indicating whether the notification message is a persistent message 210/705. All Set APB 1104 can be a Boolean value indicating whether the message is a reply message to a notification message 1102/404. APB Msg ID 1105 is a unique identifier of the notification message. In an embodiment, the APB Msg ID is used to associate an "All Set" APB reply message with an original persistent notification message, so that (307-309) after an "All Set" reply has been sent, the persistent notification message and the recipient lists may be deleted from Persistent APB Database 106. The APB Msg ID is also used to associate a persistent notification message stored 212 in Persistent APB Database 106 with the stored 213/214 associated lists of individual recipients from the selected 202 recipient group who have and have not received the persistent notification message. The remaining notification message metadata values—Sender 1106, Recipients 1107, Subject Text 1108, and Message Body Text 1109—serve the same purpose as the corresponding fields in a typical messaging system message.

Figure 12:
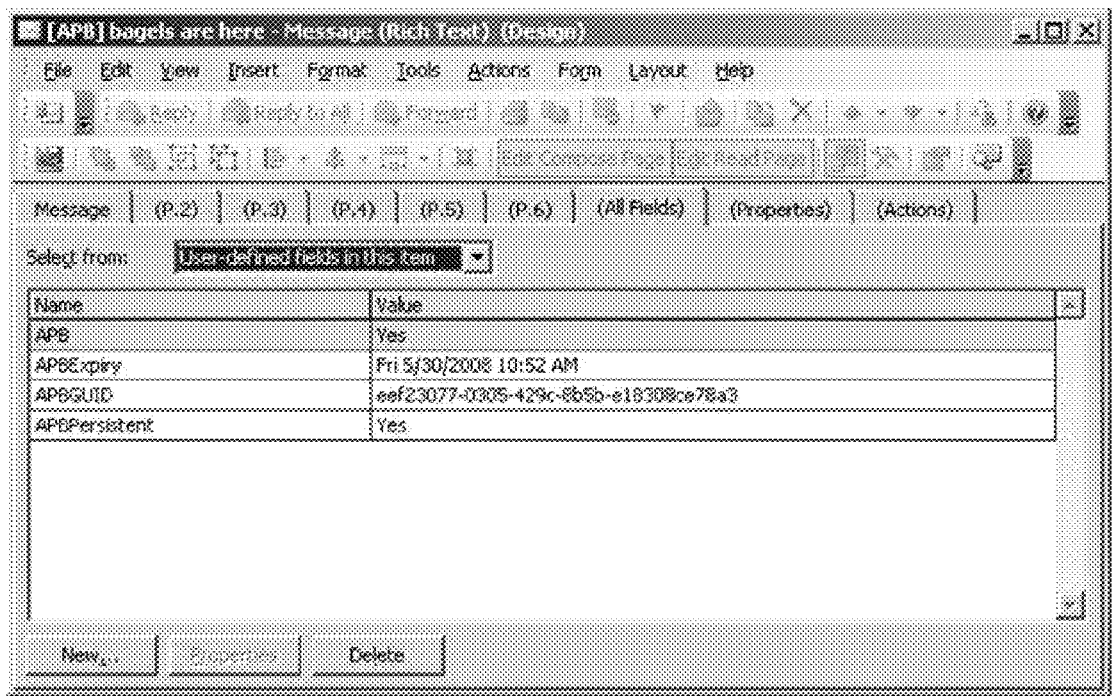
FIG. 12 shows notification message metadata for a persistent notification message, in accordance with an embodiment of the present invention.
Figure 13:
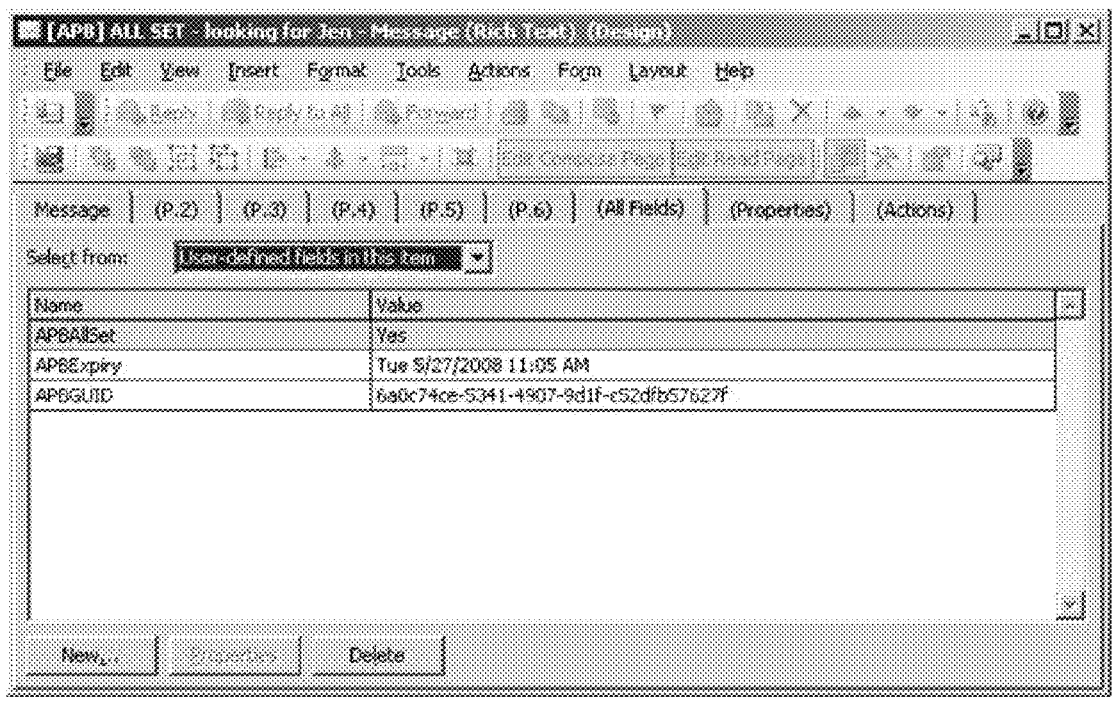
FIG. 13 shows notification message metadata for a reply message to a notification message, in accordance with an embodiment of the present invention.

FIGS. 12 and 13 show examples, in an embodiment that employs Microsoft Office Outlook, of the notification message metadata for a persistent notification message and for a reply message to a persistent notification message, respectively. These figures are the result of selecting the "User-defined fields in this item" drop-down menu item in the "(All Fields)" tab of the "Design This Form" selection under the Tools/Form menu.

It should be noted that terms such as "client," "server," "switch," and "node" may be used herein to describe devices that may be used in certain embodiments of the present invention and should not be construed to limit the present invention to any particular device type unless the context otherwise requires. Thus, a device may include, without limitation, a bridge, router, bridge-router (brouter), switch, node, server, computer, appliance, or other type of device. Such devices typically include one or more network interfaces for communicating over a communication network and a processor (e.g., a microprocessor with memory and other peripherals and/or application-specific hardware) configured accordingly to perform device functions. Communication networks generally may include public and/or private networks; may include local-area, wide-area, metropolitan-area, storage and/or other types of networks; and may employ communication technologies including, but in no way limited to, analog technologies, digital technologies, optical technologies, wireless technologies (e.g., Bluetooth), networking technologies and internetworking technologies.

It should also be noted that devices may use communication protocols and messages (e.g., messages created, transmitted, received, stored and/or processed by the device), and such messages may be conveyed by a communication network or medium. Unless the context otherwise requires, the present invention should not be construed as being limited to any particular communication message type, communication message format or communication protocol. Thus, a communication message generally may include, without limitation, a frame, packet, datagram, user datagram, cell or other type of communication message.

It should also be noted that logic flows may be described herein to demonstrate various aspects of the invention, and these logic flows should not be construed to limit the present invention to any particular logic flow or logic implementation. The described logic may be partitioned into different logic blocks (e.g., programs, modules, functions or subroutines) without changing the overall results or otherwise departing from the true scope of the invention. Logic elements may be added, modified, omitted, performed in a different order or implemented using different logic constructs (e.g., logic gates, looping primitives, conditional logic and other logic constructs), without changing the overall results or otherwise departing from the true scope of the invention.

The present invention may be embodied in many different forms, including, but in no way limited to, computer program logic for use with a processor (e.g., a microprocessor, microcontroller, digital signal processor or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other implementation including any combination thereof. In a typical embodiment of the present invention, predominantly all of the described logic is implemented as a set of computer program instructions that is converted into a computer executable form, stored as such in a computer readable medium and executed by a processor under the control of an operating system.

Computer program logic implementing all or part of the functionality described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as FORTRAN, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler or compiler) into a computer executable form.

The computer program may be fixed in any form (e.g., source code form, computer executable form or an intermediate form) either permanently or transitorily in a tangible storage medium, such as a semiconductor memory device (e.g., a RAM, ROM, PROM, EEPROM or Flash-Programmable RAM), a magnetic memory device (e.g., a diskette or fixed disk), an optical memory device (e.g., a CD-ROM), a PC card (e.g., PCMCIA card) or another memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality described herein may be designed using traditional manual methods, or it may be designed, captured, simulated or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM or Flash-Programmable RAM), a magnetic memory device (e.g., a diskette or fixed disk), an optical memory device (e.g., a CD-ROM) or another memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

The present invention may be embodied in other specific forms without departing from the true scope of the invention. Any references to the "invention" are intended to refer to exemplary embodiments of the invention and should not be construed to refer to all embodiments of the invention unless the context otherwise requires. The described embodiments are to be considered in all respects only as illustrative and not restrictive.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. An office-based computer system, comprising:
    a local network;
    a check-in computer application configured to execute over the local network and prompt a user of the office-based computer system to check in;
    a check-in database accessible on the local network and configured to store information identifying checked-in users, wherein the check-in computer application is configured to update the check-in database as users check in;
    an email system available for use by users on the office-based computer system without regard to whether the user is checked in; and
    a filtering application, integrated with the email system for use with email inboxes of the email system and in communication with the check-in database, configured to respond to an email message that is designated as an office notification message and that designates an expiration time and a recipient group by filtering out users who are not checked in from the recipients in the recipient group for the office notification message,
    wherein the office notification message is delivered by the email system to the email inboxes of the recipients remaining on the message as well as to the email inboxes of the recipients of the recipient group who check in after said email message was sent but before the expiration time.

2. The office-based computer system of claim 1 wherein it is optional for a user of the office-based computer system to check in upon being prompted.

3. The office-based computer system of claim 1 wherein a user may check out after checking-in and thereby no longer be listed as checked in in the check-in database, while maintaining an active session.

4. The office-based computer system of claim 1 wherein the check-in computer application prompts users accessing the system locally but not users working remotely.

5. The office-based computer system of claim 4 wherein the users working remotely access the system through a mobile device or through a virtualization platform.

6. The office-based computer system of claim 1 wherein recipients of the original office notification message may respond to said message by sending a reply via the email system and wherein metadata is applied to the reply message so that the expiration time in the original office notification message is copied into the reply message.

7. The office-based computer system of claim 6 wherein a sender of the reply message may change the copied message expiration time to a different time.

8. The office-based computer system of claim 6 wherein the filtering application is configured to respond to the reply message by filtering out users who are not checked in at the time of the reply from the recipients in the recipient group for the message and delivering the reply to email inboxes of recipients remaining on the message as well as to the email inboxes of recipients who check in after said reply email message was sent but before the reply message expiration time.

9. The office-based computer system of claim 1 wherein recipients of the original office notification message may respond to said message by sending a reply via the email system and wherein the original office notification message expiration is automatically reset based at least in part on a time that the reply message is sent.

10. A filtering application integrated with an email system on an office-based computer system for delivering emails to email inboxes and in communication with a check-in database, said filtering application comprising a non-transitory computer-readable storage medium having computer readable code stored thereon, the computer readable program code comprising:
    computer program code configured to respond to an email message that is designated as an office notification message and that designates an expiration time and a recipient group by filtering out users who are not checked in from the recipients in the recipient group for the office notification message, and by sending the office notification message via the email system to email inboxes of the recipients remaining on the message; and
    computer program code for periodically monitoring the check-in database while an office notification message has not yet expired to determine whether additional recipients in the recipient group have checked-in and sending the message via the email system to the email inbox of any such additional recipients.

11. The filtering application of claim 10 further comprising computer program code for automatically copying an expiration time for the reply message so as to be the same as that in the original office notification message.

12. The filtering application of claim 11 further comprising computer program code configured to respond to the reply message by filtering out users who are not checked in at the time of the reply from the recipients in the recipient group for the message and sending the reply via the email system to the email inboxes of recipients remaining on the message as well as to the email inboxes of recipients who check in after said reply email message was sent but before the reply expiration time.

13. A computer-implemented method for sending office notification messages to email inboxes of users of an office-based computer system, comprising:

prompting a user of the office-based computer system to check in upon system log in;
maintaining an indication in the office-based computer system as to which users are checked-in, based on responses by users to the prompting; and
transmitting an expiring, user-generated email message that is designated as an office notification message, to checked-in members of a recipient group by filtering out the users who are not checked in from the recipients in the recipient group and delivering the message to the email inboxes of the recipients remaining on the message as well as to the email inboxes of the recipients of the recipient group who check in after said email message was sent but before the expiration time;
wherein logged-in users who are not checked in, and who do not check in before the message expiration time, do not receive the message.

14. The method of claim 13 wherein it is optional for a user of the office-based computer system to check in upon being prompted.

15. The method of claim 13 further comprising removing, from the check-in database, any user that checks out after checking in.

16. The method of claim 13 wherein local users are prompted to check in, but not users working remotely.

17. The method of claim 16 wherein the users working remotely access the system through a mobile device or through a virtualization platform.

18. The method of claim 13 further comprising transmitting a user-generated reply message to the original office notification message and applying metadata to the reply message so that the expiration time for the original office notification message is copied to the reply message.

19. The method of claim 18 further comprising changing the copied reply expiration time to a different time.

20. The method of claim 13 further comprising transmitting a user-generated reply message to the original office notification message and automatically resetting the original office notification message expiration based at least in part on a time that the reply message is sent.

21. The method of claim 18 further comprising transmitting a user-generated reply message to the original office notification message and filtering out users who are not checked in at the time of the reply from the recipients in the recipient group for the message and delivering the reply to email inboxes of recipients remaining on the message as well as to the email inboxes of recipients who check in after said reply email message was sent but before the reply message expiration time.

22. A computer-implemented method for filtering email messages, comprising:
responding to an email message sent through an email system of an office-based computer system that is designated as an office notification message and that designates an expiration time and a recipient group, by filtering out users who are not checked in to the office-based computer system from the recipients in the recipient group for the office notification message,
delivering the office notification message to the email inboxes of recipients remaining on the message; and
periodically monitoring a check-in database of checked-in users while an office notification message has not yet expired to determine whether additional recipients in the recipient group have checked-in and sending the message via the email system to the email inboxes of such additional recipients.

23. The method of claim 22 further comprising responding to a reply message to the original office notification message by filtering out users who are not checked in at the time of the reply from the recipients in the recipient group for the message and delivering the reply to the email inboxes of recipients remaining on the reply message as well as to the email inboxes of the recipients who check in after said reply email message was sent but before the reply message expiration time.

24. The method of claim 22 further comprising automatically resetting the original office notification message expiration based at least in part on a time that the reply message is sent.

* * * * *